United States Patent
Kuwahara et al.

(10) Patent No.: US 11,165,602 B2
(45) Date of Patent: Nov. 2, 2021

(54) COMMUNICATION SYSTEM, CONTROLLED DEVICE, AND CONTROL METHOD FOR COMMUNICATION SYSTEM

(71) Applicant: Murata Machinery, Ltd., Kyoto (JP)

(72) Inventors: Tetsuya Kuwahara, Kyoto (JP); Toshihiro Fujiwara, Mie (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 16/759,382

(22) PCT Filed: Oct. 22, 2018

(86) PCT No.: PCT/JP2018/039219
§ 371 (c)(1),
(2) Date: Apr. 27, 2020

(87) PCT Pub. No.: WO2019/087849
PCT Pub. Date: May 9, 2019

(65) Prior Publication Data
US 2020/0295967 A1    Sep. 17, 2020

(30) Foreign Application Priority Data
Oct. 31, 2017  (JP) .............................. JP2017-211175

(51) Int. Cl.
*H04L 12/437*       (2006.01)
*G05B 19/418*       (2006.01)
(52) U.S. Cl.
CPC ........ *H04L 12/437* (2013.01); *G05B 19/4186* (2013.01); *G05B 2219/31145* (2013.01)

(58) Field of Classification Search
CPC .............. H04L 12/437; G05B 19/4186; G05B 2219/31145; H04M 11/00
See application file for complete search history.

(56) References Cited

U.S. PATENT DOCUMENTS 6,047,222 A * 4/2000 Burns ................ G05B 19/4184
                                                       700/79
8,279,762 B2 * 10/2012 Ozaki ........................ H04J 3/14
                                                       370/250

(Continued)

FOREIGN PATENT DOCUMENTS

JP    2005-012599 A    1/2005
JP    4904399 B2       3/2012

(Continued)

*Primary Examiner* — Hoang-Chuong Q Vu
(74) *Attorney, Agent, or Firm* — DLA Piper LLP (US)

(57) ABSTRACT

A communication system includes a plurality of controlled devices each including communication IFs compliant with EtherCAT standards; network connected to communication IF of each of controlled devices, network connected to communication IF of each of controlled devices; control apparatus capable of sending out first control data for controlling controlled devices to network; control apparatus capable of sending out second control data for controlling controlled devices to network; and main control apparatus that performs first control that causes control apparatus to send out the first control data. Main control apparatus further performs second control that causes control apparatus to send out the second control data when the sent first control data fails to reach at least one of controlled devices.

7 Claims, 12 Drawing Sheets

(56) References Cited

U.S. PATENT DOCUMENTS

| | | | | |
|---|---|---|---|---|
| 10,003,575 B2* | 6/2018 | Shimomura | .......... | H04W 12/37 |
| 2003/0055900 A1* | 3/2003 | Glas | .................. | H04L 12/40163 |
| | | | | 709/205 |
| 2009/0292845 A1 | 11/2009 | Buttner et al. | | |
| 2010/0077471 A1* | 3/2010 | Schleiss | ............. | G05B 19/0428 |
| | | | | 726/13 |
| 2011/0029687 A1* | 2/2011 | Kirrmann | ............. | H04L 12/437 |
| | | | | 709/236 |
| 2014/0140348 A1* | 5/2014 | Perlman | .................. | H04L 45/38 |
| | | | | 370/400 |
| 2014/0364998 A1* | 12/2014 | Neiser | .................... | B65G 43/08 |
| | | | | 700/230 |
| 2015/0012140 A1* | 1/2015 | Fang | ................. | G05B 19/0421 |
| | | | | 700/275 |
| 2015/0078200 A1* | 3/2015 | Kalkunte | ................ | H04L 45/72 |
| | | | | 370/254 |
| 2015/0172220 A1 | 6/2015 | Rahamim et al. | | |
| 2015/0281335 A1* | 10/2015 | Heine | ..................... | H04L 12/42 |
| | | | | 709/204 |
| 2017/0097617 A1* | 4/2017 | Tegnell | ..................... | G05B 9/03 |
| 2018/0024537 A1* | 1/2018 | Chauvet | ................ | G06F 9/4881 |
| | | | | 718/104 |
| 2018/0091931 A1* | 3/2018 | Orten | ........................ | H04B 7/26 |
| 2018/0210854 A1* | 7/2018 | Vonnahme | .......... | G06F 13/4068 |
| 2019/0026242 A1* | 1/2019 | Osborne | .............. | G07F 19/209 |

FOREIGN PATENT DOCUMENTS

| | | |
|---|---|---|
| JP | 2013-201664 A | 10/2013 |
| JP | 2014-011542 A | 1/2014 |
| JP | 2015-127926 A | 7/2015 |

\* cited by examiner

FIG. 2

| Time of receipt | Transmission source | |
|---|---|---|
| 2017/01/01 01:01:01 | 20A | T1 |
| 2017/01/01 01:01:02 | 20B | |
| 2017/01/01 01:01:06 | 20A | |
| 2017/01/01 01:01:07 | 20B | |
| 2017/01/01 01:01:11 | 20A | |
| 2017/01/01 01:01:12 | 20B | |
| 2017/01/01 02:01:02 | 20B | T2 |
| 2017/01/01 02:01:07 | 20B | |
| 2017/01/01 02:01:12 | 20B | |

FIG. 3

| Common ID | Active-system ID | Standby-system ID |
|---|---|---|
| 00001 | 001 | 257 |
| 00002 | 002 | 258 |
| 00255 | 255 | 511 |

COMMUNICATION SYSTEM, CONTROLLED DEVICE, AND CONTROL METHOD FOR COMMUNICATION SYSTEM

TECHNICAL FIELD

This disclosure relates to a communication system, a controlled device, and a control method for a communication system.

BACKGROUND

Networks of control communications for equipment installed in factories or other facilities use ring-type communication standards such as Ethernet for Control Automation Technology (EtherCAT) from the viewpoint of communication redundancy and immediacy.

Devices connected to an EtherCAT network include control apparatuses (also referred to as "masters") and controlled devices (also referred to as "slaves"). As one form, the EtherCAT network may have a ring topology. A frame sent out from a control apparatus is received by a controlled device adjacent to the control apparatus, then sent out from the controlled device, and received by another controlled device adjacent to the previous controlled device. The frame is thereafter sent out to adjacent controlled devices sequentially and finally received by the control apparatus, i.e., circulates through the network.

Japanese Patent No. 4904399 discloses a technique relating to the switching of paths at the time when a fault has occurred in EtherCAT networks.

According to the technique disclosed in JP '399, when a fault has occurred at a single location in a network having a ring-type network topology (also referred to as a "topology"), communications can be maintained by changing the topology.

There is, however, a problem that communications cannot be maintained when faults have occurred at two or more locations in the network or when a fault has occurred in a control apparatus.

It could therefore be helpful to provide a communication system that configures a ring-type network with enhanced fault tolerance.

SUMMARY

We thus provide:

A communication system includes a plurality of controlled devices each including a first interface and a second interface, the first interface having a first input port and a first output port and being compliant with Ethernet for Control Automation Technology (EtherCAT) standards, and the second interface having a second input port and a second output port and being compliant with EtherCAT standards, a first network connected to the first interface of each of the plurality of controlled devices, a second network connected to the second interface of each of the plurality of controlled devices, an active control apparatus connected to the first network and capable of sending out first control data for controlling the plurality of controlled devices to the first network, a standby control apparatus connected to the second network and capable of sending out second control data for controlling the plurality of controlled devices to the second network, and a main control apparatus that performs first control that causes the active control apparatus to send out the first control data. The main control apparatus further performs second control that causes the standby control apparatus to send out the second control data when the first control data that has been sent out fails to reach at least one of the plurality of controlled devices.

Accordingly, when the first network has a loopback topology, the communication system can maintain communications between a control apparatus and a plurality of controlled devices even if a fault has occurred in the active control apparatus or at a single location in the first network. When the first network has a ring topology, the communication system can maintain communications between a control apparatus and a plurality of controlled devices even if a fault has occurred in the active control apparatus or at two or more locations in the first network. The term "control apparatus" means at least one of the active control apparatus and the standby control apparatus. In this way, the communication system can configure a ring-type network with enhanced fault tolerance.

In the first control, the active control apparatus may acquire a total number of controlled devices that the first control data has reached among the plurality of controlled devices, from information included in the first control data received via the first network, and the second control may be performed when it is determined that the total number that has been acquired is smaller than a total number of the plurality of controlled devices.

This allows the communication system to easily determine whether the first control data has reached all of the controlled devices, on the basis of the information that is recorded by the controlled devices in the control data circulating through the first network and that indicates the number of controlled devices that the control data has reached. Accordingly, the communication system can more easily configure a ring-type network with enhanced fault tolerance.

Moreover, the main control apparatus may further determine whether a communication packet has been received from the active control apparatus within a predetermined period of time, and perform the second control when it is determined that the communication packet has not been received within the predetermined period of time.

This allows the communication system to easily determine whether the active control apparatus is operating normally on the basis of whether a communication packet has been received from the active control apparatus. Accordingly, the communication system can more easily configure a ring-type network with enhanced fault tolerance.

After performing the second control in response to the communication packet not being received from the active control apparatus within the predetermined period of time, the main control apparatus may further perform the first control when another communication packet has been received from the active control apparatus within another predetermined period of time.

Thus, after the communication system has transitioned from a state in which the active control apparatus is used for communications with the controlled devices to a state in which the standby control apparatus is used for communications with the controlled devices, the communication system can automatically return to the state of using the active control apparatus for communications with the controlled devices, on the basis of whether a communication packet has been received from the active control apparatus. Accordingly, the communication system can provide easy operability at the time of recovery from faults.

The first network may have a ring topology that connects the active control apparatus and the first interface of each of the plurality of controlled devices.

The first network having a ring topology allows the communication system to maintain communications between a control apparatus and a plurality of controlled devices even if a fault has occurred in the active control apparatus or at two or more locations in the first network.

The communication system further includes a plurality of second controlled devices each including a first interface and a second interface and being different from a plurality of first controlled devices serving as the plurality of controlled devices, the first interface having a first input port and a first output port and being compliant with EtherCAT standards, and the second interface including a second input port and a second output port and being compliant with EtherCAT standards, a third network connected to the first interface of each of the plurality of second controlled device, a fourth network connected to the second interface of each of the plurality of second controlled devices, and a second active control apparatus that is different from a first active control apparatus serving as the active control apparatus, that is connected to the third network, and that sends out third control data for controlling the plurality of second controlled devices to the third network. The standby control apparatus is further connected to the fourth network. The standby control apparatus may send out fourth control data for controlling the plurality of second controlled devices to the fourth network. The main control apparatus may further perform third control that causes the second active control apparatus to send out the third control data, and the main control apparatus may further perform fourth control that causes the standby control apparatus to send out the fourth control data when the third control data fails to reach at least one of the plurality of second controlled devices.

The communication system may use different networks for communications from the control apparatus to the plurality of first controlled devices and for communications from the control apparatus to the plurality of second controlled devices. Accordingly, the communication system can communicate with a greater number of controlled devices than when using a single network for communications with the controlled devices, and can also reduce the processing load on the control apparatus. Besides, the standby control apparatus used for the plurality of first controlled devices is also used for the control of the plurality of second controlled device. That is, the standby control apparatus is used for both of the communications with the plurality of first controlled devices and the communications with the plurality of second controlled devices. This reduces the number of standby devices and achieves a cost reduction effect.

A controlled device includes a first interface having a first input port and a first output port and being compliant with Ethernet for Control Automation Technology (EtherCAT) standards, and a second interface having a second input port and a second output port and being compliant with EtherCAT standards. The first interface is connected to an active control apparatus via a first network, the active control apparatus being capable of sending out first control data for controlling the controlled device to the first network. The second interface is connected to a standby control apparatus via a second network, the standby control apparatus being capable of sending out second control data for controlling the controlled device to the second network. When the first control data sent out from the active control apparatus has been received, the controlled device operates under control based on the first control data that has been received. When the second control data sent out from the standby control apparatus has been received, the controlled device operates under control based on the second control data that has been received.

This achieves similar effects to those of the above-described communication system.

In a control method for a communication system, the communication system includes a plurality of controlled devices each including a first interface and a second interface, the first interface having a first input port and a first output port and being compliant with Ethernet for Control Automation Technology (EtherCAT) standards, and the second interface having a second input port and a second output port and being compliant with EtherCAT standards, a first network connected to the first interface of each of the plurality of controlled devices, a second network connected to the second interface of each of the plurality of controlled devices, an active control apparatus connected to the first network and capable of sending out first control data for controlling the plurality of controlled devices to the first network, a standby control apparatus connected to the second network and capable of sending out second control data for controlling the plurality of controlled devices to the second network, and a main control apparatus. The control method includes causing the main control apparatus to perform first control that causes the active control apparatus to send out the first control data, and causing the main control apparatus to perform second control that causes the standby control apparatus to send out the second control data when the first control data that has been sent out fails to reach at least one of the plurality of controlled devices.

This achieves similar effects to those of the above-described communication system.

This disclosure is directed not only to a device, but also a method using processing means of the device as steps, in the form of a program for causing a computer to execute the steps, in the form of a computer-readable recording medium such as a CD-ROM that records the program, or in the form of information, data, or a signal indicating the program. These program, information, data, and signal may be distributed via a communication network such as the Internet.

The communication system can thus configure a ring-type network with enhanced fault tolerance.

BRIEF DESCRIPTION OF THE DRAWINGS

FIG. 2 is an explanatory diagram illustrating a log retained by a detector according to Example 1.

FIG. 3 is an explanatory diagram illustrating an ID correspondence table held in a controller according to Example 1.

REFERENCE SIGNS LIST

Figure 1:
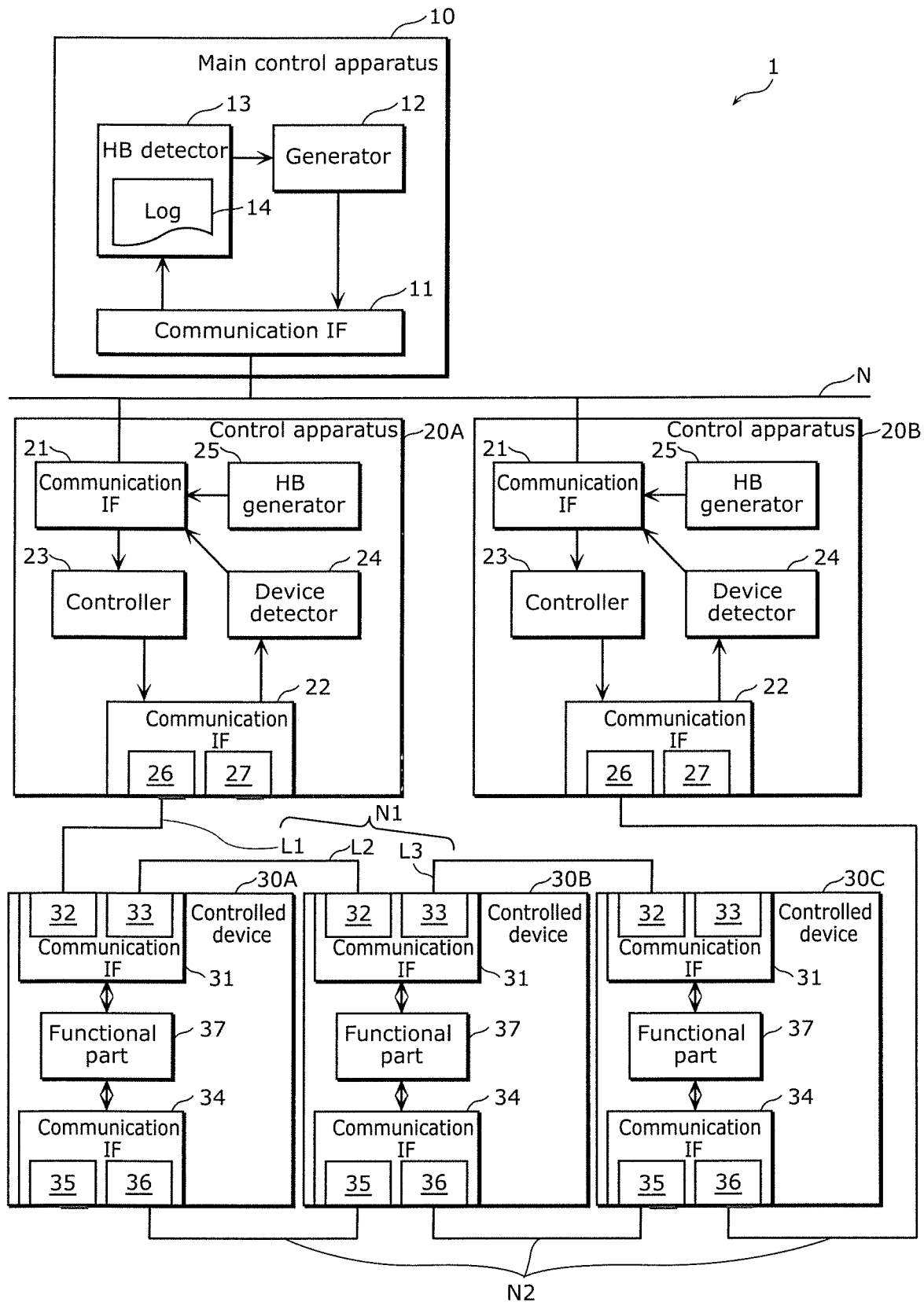
FIG. 1 is a block diagram illustrating a functional configuration of a communication system according to Example 1.

1, 2 communication system
10 main control apparatus
11, 21, 22, 31, 34 communication IF
12 generator
13 HB detector
14 log
20A, 20B, 20C control apparatus
23 controller
24 device detector
25 HB generator
26, 27, 32, 33, 35, 36 port
30A, 30B, 30C, 30D, 30E, 30F controlled device
37 functional part
L1, L2, L3, L4 link
N, N1, N2, N3, N4 network
T1, T2 period

DETAILED DESCRIPTION

Hereinafter, examples will be described in detail with reference to the drawings.

Any example described below is a preferable specific configuration. Numerical values, shapes, materials, constituent elements, the positions of arrangement of constituent elements and the form of connection thereof, steps, the order of steps, and others given in the following are merely examples, and do not intend to limit this disclosure. Among the constituent elements given in the following examples, those that are not recited in any of the appended claims, which represent the broadest concepts herein, are described as optional constituent elements that constitute more preferable examples.

Identical constituent elements are given the same reference signs, and descriptions thereof may not be given.

Example 1

This example describes a communication system that configures a ring-type network with enhanced fault tolerance.

First, a configuration of the communication system according to Example 1 will be described.

FIG. 1 is a block diagram illustrating a functional configuration of communication system 1 according to Example 1.

As illustrated in FIG. 1, communication system 1 includes main control apparatus 10, control apparatuses 20A and 20B, networks N, N1, and N2, and controlled devices 30A, 30B, and 30C.

Communication system 1 is a communication system that controls controlled devices 30A to 30C. For example, communication system 1 is used in communications for I/O control (control of sensors, motors, or other devices) between a main control apparatus and controlled devices in a network of control communications for equipment installed in factories or other facilities.

Main control apparatus 10 is a computer that manages the entire facility including controlled devices 30A to 30C, and controls controlled devices 30A to 30C. Specifically, main control apparatus 10 causes control apparatus 20A to send out control data, and further causes control apparatus 20B to send out control data when the sent control data fails to reach at least one of controlled devices 30A to 30C. The control data sent out from control apparatus 20A is also referred to as "first control data," and the control that causes control apparatus 20A to send out control data is also referred to as "first control." The control data sent out from control apparatus 20B is also referred to as "second control data," and the control that causes control apparatus 20B to send out control data is also referred to as "second control."

Control apparatus 20A is a computer that controls controlled devices 30A to 30C in accordance with a control command received from main control apparatus 10. Control apparatus 20A is connected to each of controlled devices 30A to 30C via network N1. Control apparatus 20A determines specific operations to be performed by controlled devices 30A to 30C, in accordance with I/O control information included in the control command received from main control apparatus 10. Then, control apparatus 20A sends out communication packets (also referred to as "packets") that include control data that cause each of controlled devices 30A to 30C to perform a determined operation, to network N1. Control apparatus 20A can be hardware such as a personal computer (PC). Control apparatus 20A is also referred to as an "active control apparatus."

Control apparatus 20B is a control apparatus having a similar function to that of control apparatus 20A. Control apparatus 20B is connected to network N2. Control apparatus 20B is connected to each of controlled devices 30A to 30C via network N2, and sends out generated control data to network N2, like control apparatus 20A. Control apparatus 20B is also referred to as a "standby control apparatus."

Network N1 is a network connected to physical port 26 (also referred to as a "port") of control apparatus 20A and each of controlled devices 30A to 30C. Network N1 is a network formed by daisy-chaining of control apparatus 20A and controlled devices 30A to 30C (so-called "tying in a row"). A specific example thereof is a network compliant with EtherCAT communication standards. Specifically, port 26 of control apparatus 20A and port 32 of controlled device 30A are connected via communication link L1 (also referred to as a "link"), port 33 of controlled device 30A and port 32 of controlled device 30B are connected via link L2, and port 33 of controlled device 30B and port 32 of controlled device 30C are connected via link L3.

Network N1 can selectively adopt a loopback topology (topology drawn with one stroke) using control apparatus 20A as one end, and a ring topology (annular topology) using control apparatus 20A as part of the ring. Network N1 illustrated in FIG. 1 has a loopback topology.

Network N2 is a network connected to port 26 of control apparatus 20B and each of controlled devices 30A to 30C, and has a similar function to that of network N1.

Controlled device 30A is, for example, equipment that is subjected to I/O control processing (e.g., control of sensors, motors, or other devices), and operates under the control of main control apparatus 10.

Controlled device 30A includes two communication interfaces (IFs) 31 and 34, communication IF 31 being connected to network N1 and communication IF 34 being connected to network N2. When packets are received via communication IF 31, controlled device 30A operates in accordance with control data included in the received packets, and when packets are received via communication IF 34, controlled device 30A operates in accordance with control data included in the received packets.

Controlled devices 30B and 30C have similar functions to that of controlled device 30A. Each of controlled devices 30B and 30C receives control data independently of controlled device 30A and operates independently. Example 1 describes when communication system 1 includes three controlled devices 30A, 30B, and 30C, but this disclosure is not limited thereto, and the communication system may include several tens or hundreds of controlled devices.

The packets sent out from control apparatus 20A to network N1 are received by controlled device 30A via network N1. Controlled device 30A acquires control data that is included in the received packets and addressed to itself, and operates in accordance with the acquired control data. In possessing data to be transmitted to control apparatus 20A, controlled device 30A includes that data in the packets and sends out the packets to network N1. The sent packets are received by controlled device 30B, subjected to similar processing, and sent out to network N1. In this way, the packets sent out from control apparatus 20A circulate through network N1 and return to control apparatus 20A.

Control apparatus 20B and network N2 function as a standby (or spare) control apparatus and a standby network that control controlled devices 30A to 30C when any fault has occurred in control apparatus 20A or network N1. In contrast, control apparatus 20A and network N1 serve as an active (or operational) control apparatus and an active network that controls controlled devices 30A to 30C under normal conditions.

Next, a detailed configuration of each of main control apparatus 10, control apparatuses 20A and 20B, and the controlled devices will be described.

As illustrated in FIG. 1, main control apparatus 10 includes communication IF 11, generator 12, and HB detector 13.

Communication IF 11 is a communication interface device communicably connected to network N. Communication IF 11 is connected to communication IF 21 of each of control apparatuses 20A and 20B via network N. Examples of communication standards for communication IF 11 include wired local area networks (LANs) compliant with IEEE802.3 standards, and wireless LANs compliant with IEEE802.11a/b/g/n or other standards, but the communication standards are not limited thereto.

Generator 12 is a processing part that generates a control command that controls each of controlled devices 30A to 30C. For example, the control command is information about I/O control and, more specifically, information as to which equipment is used and how to operate the equipment. Generator 12 is a processor executing programs using, for example, a memory.

Generator 12 sends out the generated control command to network N via communication IF 11. Generator 12 determines the destination of the control command to be sent out on the basis of detection information received from HB detector 13. Specifically, generator 12 references log 14 of heart-beat signals retained by HB detector 13, and determines whether heart-beat signals have been received respectively from control apparatuses 20A and 20B or not within a predetermined period of time (e.g., approximately five seconds) until the present moment. If it is determined that control apparatus 20A is operating under normal conditions, in response to the heart-beat signals being received from control apparatus 20A within the above predetermined period of time, generator 12 controls control apparatus 20A by transmitting the control command to control apparatus 20A. On the other hand, if it is determined that control apparatus 20A is operating under abnormal conditions, in response to the heart-beat signals not being received at regular time intervals from control apparatus 20A, generator 12 controls control apparatus 20B by transmitting the control command to control apparatus 20B. If heart-beat signals are received from control apparatus 20A after the control of control apparatus 20B, performed in response to the heart-beat signals not being received at regular time intervals from control apparatus 20A, generator 12 may automatically control control apparatus 20A. This is to provide easy operability at the time of recovery from faults. Alternatively, it is also possible to inhibit the above automatic control of control apparatus 20A. This is because if control is performed to return to the original state automatically, irrespective of the condition in which the cause of the faults is not cleared, the return may cause another fault.

Generator 12 also changes the destination of the control command to be sent out, from control apparatus 20A to control apparatus 20B when a switching signal is received from control apparatus 20A. The switching signal is a signal transmitted from control apparatus 20A to main control apparatus 10 and indicating that the destination of the control command is changed from control apparatus 20A to control apparatus 20B.

Generator 12 also manages common IDs that serve as identifiers enabling unique identification of each of controlled devices 30A to 30C, and includes the common IDs of controlled devices targeted for control, in the control command.

HB detector 13 is a processing part that detects heart-beat signals from control apparatuses 20A and 20B. HB detector 13 is a processor executing programs using, for example, a memory.

HB detector 13 monitors whether communication IF 11 receives heart-beat signals transmitted at regular time intervals from control apparatuses 20A and 20B, from network N. HB detector 13 detects a heart-beat signal when communication IF 11 has received the heart-beat signal from network N. Upon detecting the heart-beat signal, HB detector 13 stores information indicating the detection time of the heart-beat signal and information indicating the transmission source of the heart-beat signal in log 14. Log 14 is a storage device such as a memory or a storage.

Instead of detecting heat-beat signals, HB detector 13 may detect somewhat packets transmitted from control apparatuses 20A and 20B. This brings about an advantage that it is possible to know the conditions of control apparatuses 20A and 20B without using dedicated signals, i.e., heart-beat signals.

Next, control apparatus 20A will be described.

As illustrated in FIG. 1, control apparatus 20A includes communication IFs 21 and 22, controller 23, device detector 24, and HB generator 25.

Communication IF 21 is a communication interface device communicably connected to network N. Communication IF 21 is connected to communication IF 11 of main control apparatus 10 via network N. Examples of communication standards for communication IF 21 include wired local area networks (LANs) compliant with IEEE802.3 standards, and wireless LANs compliant with IEEE802.11a/b/g/n or other standards, but the communication standards are not limited thereto.

Communication IF 22 is a communication interface device communicably connected to network N1. Communication IF 22 includes two ports 26 and 27 connected to network N1. If both of ports 26 and 27 are in a link up state, communication IF 22 causes one of ports 26 and 27 to function as an input port and the other port to function as an output port. If only either of ports 26 and 27 is in a link up state, communication IF 22 causes the linked-up port to function as input and output ports.

Controller 23 is a processing part that controls the operations of controlled devices 30A to 30C in accordance with the control command received from main control apparatus 10. Controller 23 is a processor executing programs using, for example, a memory.

Specifically, controller 23 determines specific operations to be performed by controlled devices 30A to 30C in accordance with a control plan received from main control apparatus 10. Controller 23 then generates control data that causes the controlled devices to perform the operations, and sends out the generated control data to network N1 via communication IF 22. The control data includes IDs (also referred to as "active-system IDs") of the controlled devices to be controlled by the control data. A detail of the IDs will be described later.

Device detector 24 is a processing part that detects the number of controlled devices 30A to 30C. Device detector 24 is a processor executing programs using, for example, a memory.

When the control data that has circuited through the network is received via communication IF 22, device detector 24 detects the number of controlled devices that the control data has reached, on the basis of a counter included in the received control data. This counter may, for example, be a working counter in the frame format of EtherCAT, but the counter is not limited thereto, and it is also possible to use the number of controlled devices that the control data has reached, calculated by using information included in the received control data. If the number of controlled devices that the control data has reached is smaller than the total number of controlled devices, device detector 24 transmits a switching signal to main control apparatus 10. This is to cause control apparatus 20B to carry out communications because control apparatus 20A has failed to communicate with each of controlled devices 30A to 30C. Device detector 24 is assumed to grasp the total number of controlled devices 30A to 30C connected to network N1 or the total number of controlled devices 30A to 30C supposed to be connected to network N1.

HB generator 25 is a processing part that generates a heart-beat signal at regular time intervals and transmits the generated heart-beat signal to main control apparatus 10 via communication IF 21. The heart-beat signal is a signal indicating that control apparatus 20A is normally operating. The signal is generated and transmitted to main control apparatus 10 at predetermined time intervals (e.g., every five seconds). The heart-beat signal includes an identifier that uniquely identifies control apparatus 20A, and may also include other arbitrary information. When other packets are transmitted at regular time intervals from control apparatus 20A to main control apparatus 10, these packets may also serve as heart-beat signals. HB generator 25 is a processor executing programs using, for example, a memory.

Control apparatus 20B has a similar function to that of control apparatus 20A. Network N2 is the connection destination of communication IF 22 of control apparatus 20B. Control data sent out from control apparatus 20B is given standby systems ID different from the active-system IDs.

Next, controlled device 30A will be described.

As illustrated in FIG. 1, controlled device 30A includes communication IFs 31 and 34 and functional part 37.

Communication IF 31 is a communication interface device communicably connected to network N1. Communication IF 31 includes two ports 32 and 33 connected to network N1. Communication IF 31 is assigned an active-system ID. The form of causing ports 32 and 33 to function as either an input or output port is similar to that of communication IF 22 of control apparatus 20A. Communication IF 31 corresponds to a first interface.

Communication IF 34 is a communication interface device communicably connected to network N2. Communication IF 34 includes two ports 35 and 36 connected to network N2. Communication IF 34 is assigned a standby-system ID. The form of causing ports 35 and 36 to function as either an input or output port is similar to that of communication IF 22 of control apparatus 20A. Communication IF 34 corresponds to a second interface.

Functional part 37 is a processing part that exerts main functions of controlled device 30A. When control data sent out from control apparatus 20A and including the ID of the own device is received via network N1, functional part 37 operates in accordance with the control data received via network N1. When control data sent out from control apparatus 20B is received via network N2, functional part 37 operates in accordance with the control data received via network N2. Functional part 37 has functions such as causing controlled device 30A to perform I/O control. Functional part 37 is a processor executing programs using, for example, a memory.

FIG. 2 is an explanatory diagram illustrating log 14 retained by HB detector 13 according to Example 1.

As illustrated in FIG. 2, log 14 includes one or more entries. A single entry corresponds to a single heart-beat signal detected by HB detector 13. Each entry includes information indicating the time of receipt of the heart-beat signal and information indicating the transmission source of the heart-beat signal.

For example, a log over period T1 out of log 14 records the fact that a heart-beat signal from each of control apparatuses 20A and 20B has been detected every five seconds. Thus, generator 12 determines that both of control apparatuses 20A and 20B are under normal operating conditions during period T1.

A log over period T2 out of log 14 records the fact that a heart-beat signal from control apparatus 20B has been detected every five seconds, and the fact that no heart-beat signals from control apparatus 20A have been detected. Thus, generator 12 determines that control apparatus 20A is under abnormal operating conditions and control apparatus 20B is under normal operating conditions during period T2.

FIG. 3 is an explanatory diagram illustrating an ID correspondence table held in controller 23 according to Example 1.

As illustrated in FIG. 3, the ID correspondence table associates the common IDs with the active-system IDs and the standby-system IDs.

For example, a common ID of 00001 is associated with an active-system ID of 001 and a standby-system ID of 257.

When a control command is received from main control apparatus 10 via communication IF 21, controller 23 of control apparatus 20A converts the common ID included in the received control command into the active-system ID associated with that common ID to generate control data.

When a control command is received from main control apparatus 10 via communication IF 21, controller 23 of control apparatus 20B converts the common ID included in the received control command into the standby-system ID associated with that common ID to generate control data.

Controller 23 of control apparatus 20A may hold at least the column of common IDs and the column of active-system IDs in the ID correspondence table. Also, controller 23 of control apparatus 20B may hold at least the column of common IDs and the column of standby system in the ID correspondence table.

Operations of communication system 1 configured as described above will be described.

Figure 4:
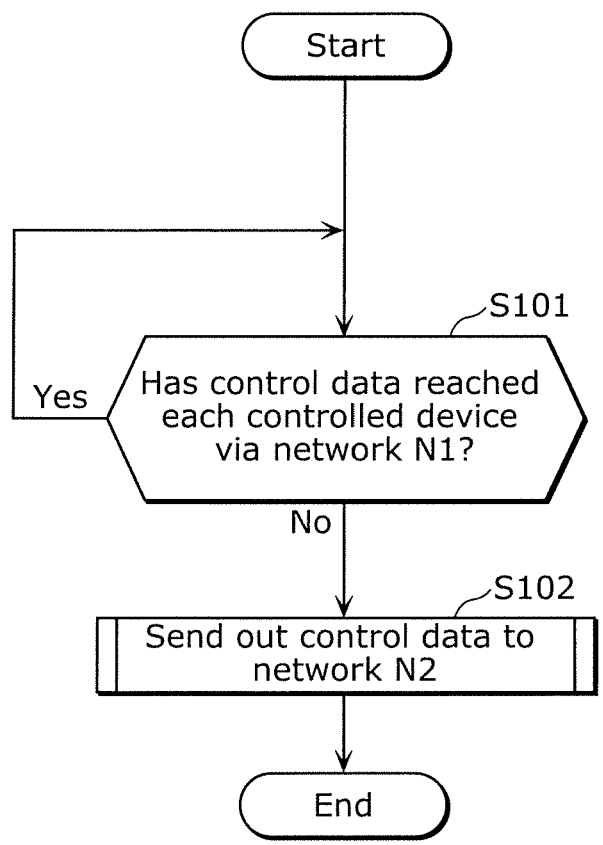
FIG. 4 is a first flowchart illustrating a control method for the communication system according to Example 1.

FIG. 4 is a first flowchart illustrating a control method used by main control apparatus 10 of communication system 1 according to Example 1.

In step S101, main control apparatus 10 performs control (i.e., first control) that causes control apparatus 20A to send out control data. Main control apparatus 10 determines whether the sent control data has reached each of controlled devices 30A to 30C. If it is determined that the sent control data has reached each of controlled devices 30A to 30C, (Yes in step S101), step S101 is executed again and, if not, i.e., if the control data fails to reach at least one of controlled devices 30A to 30C, the processing proceeds to step S102.

In step S102, main control apparatus 10 performs control (i.e., second control) that causes control apparatus 20B to send out control data.

Operation of communication system 1 will be described in more detail hereinbelow.

Figure 5:
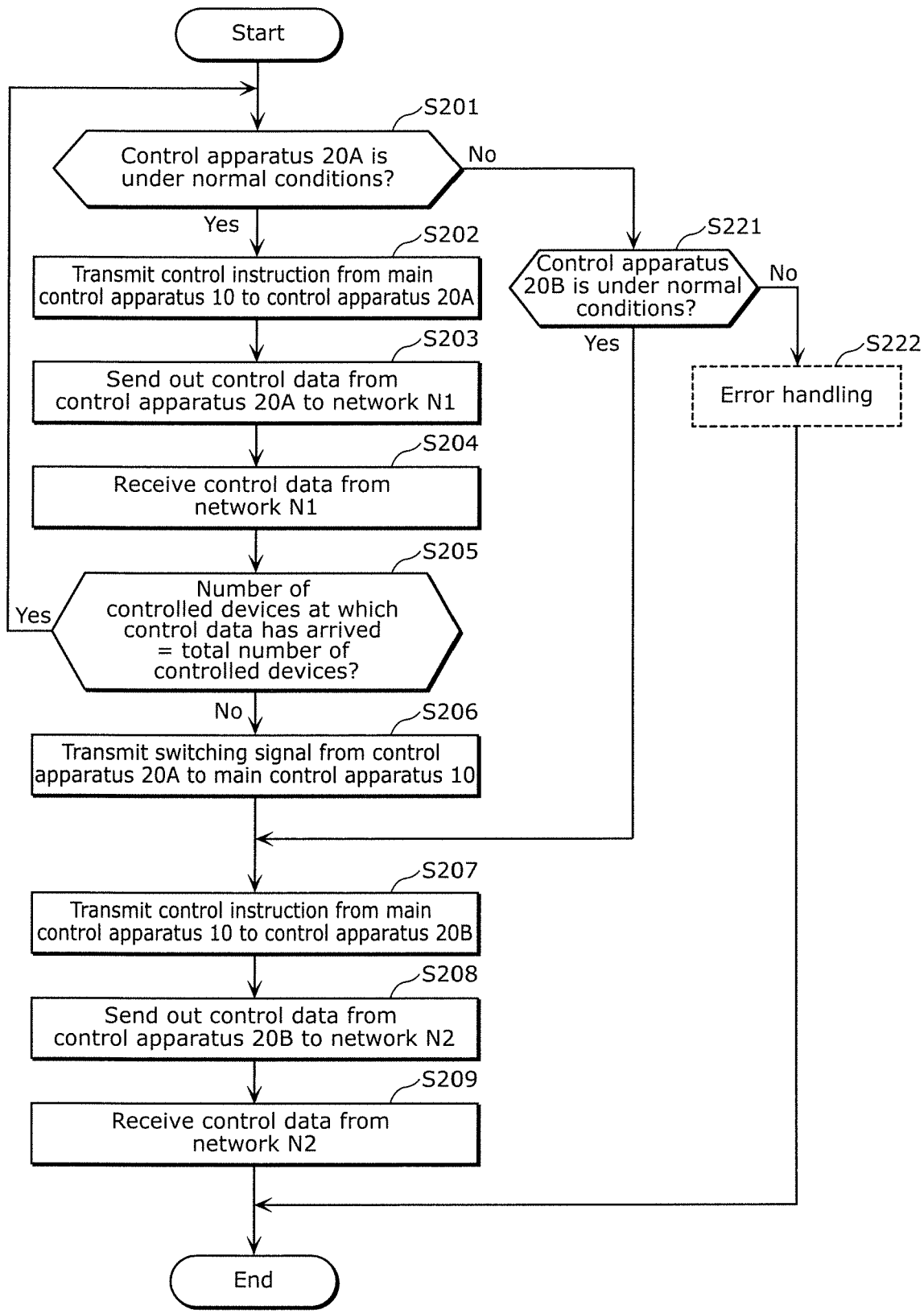
FIG. 5 is a second flowchart illustrating a control method for the communication system according to Example 1.

FIG. 5 is a second flowchart illustrating a control method used by main control apparatus 10 of communication system 1 according to Example 1. The flowchart in FIG. 5 illustrates processing performed when main control apparatus 10 transitions from a state in which a control command is transmitted to control apparatus 20A (the state corresponding to steps S201 to S205 described below) to a state in which a control command is transmitted to control apparatus 20B (the state corresponding to steps S207 to S209 described below), depending on whether the control data has reached the controlled devices.

In step S201, generator 12 of main control apparatus 10 references log 14 and determines whether control apparatus 20A is under normal conditions. If it is determined that control apparatus 20A is under normal conditions (Yes in step S201), the processing proceeds to step S202, and if not (No in step S201), the processing proceeds to step S221.

In step S202, generator 12 of main control apparatus 10 generates a control command for controlling controlled devices 30A to 30C and transmits the generated control command to control apparatus 20A.

In step S203, control apparatus 20A receives the control command transmitted from main control apparatus 10 in step S202. Then, controller 23 of control apparatus 20A generates control data in accordance with the received control command and sends out the generated control data to network N1. The sent control data is successively transferred by controlled devices 30A to 30C and thereby circulates through network N1.

In step S204, control apparatus 20A receives the control data that has circulated through network N1.

In step S205, device detector 24 of control apparatus 20A acquires information that indicates the number of controlled devices that the control data has reached, from the control data received in step S204. Device detector 24 then determines whether the acquired number of controlled devices that the control data has reached matches with the total number of controlled devices 30A to 30C. If it is determined that the number of controlled devices that the control data has reached matches with the total number of controlled devices ("Yes" in step S205), the processing proceeds to step S201. On the other hand, if it is determined that the number of controlled devices that the control data has reached is different from, or more specifically smaller than, the total number of controlled devices ("No" in step S205), the processing proceeds to step S206.

In step S206, device detector 24 of control apparatus 20A transmits a switching signal to main control apparatus 10.

In step S207, main control apparatus 10 sets control apparatus 20B as another destination of control commands. This is conducted based on the fact that the switching signal transmitted in step S206 has been received (step S206), or the fact that it is determined that control apparatus 20A is not under normal conditions and control apparatus 20B is under normal conditions (Yes in step S221). Moreover, generator 12 of main control apparatus 10 generates another control command that controls controlled devices 30A to 30C and transmits the generated control command to control apparatus 20B.

In step S208, control apparatus 20B receives the control command transmitted from main control apparatus 10 in step S207. Controller 23 of control apparatus 20B then generates control data in accordance with the received control command and sends out the generated control data to network N2. The sent control data is successively transferred by controlled devices 30A to 30C and thereby circulates through network N2.

In step S209, control apparatus 20B receives the control data that has circulated through network N2. After step S209 is completed, the series of processing illustrated in FIG. 5 ends.

In step S221, generator 12 of main control apparatus 10 determines, on the basis of log 14, whether control apparatus 20B is under normal conditions. If control apparatus 20B is under normal conditions ("Yes" in step S221), the processing proceeds to step S207, and if not ("No" in step S221), the processing proceeds to step S222.

In step S222, generator 12 of main control apparatus 10 performs predetermined error handling. The processing in step S222 is performed when both of control apparatuses 20A and 20B are not under normal conditions, i.e., cannot perform control of controlled devices 30A to 30C. The predetermined error handling includes, for example, informing an operator of the condition via communication or an alarm, and producing records. Alternatively, the predetermined error handling may not be performed. After the processing in step S222 is completed, the series of processing illustrated in FIG. 5 ends.

After step S209 is completed, main control apparatus 10 may repeatedly execute the transmission of a control command to control apparatus 20B (step S207), or may transition with the occurrence of a predetermined event to a state in which a control command is repeatedly transmitted to control apparatus 20A (step S202). Possible examples of the predetermined event include a lapse of a predetermined period of time, and a change in settings made by an operator such as the transmission as mentioned above.

When a fault has occurred in link L1 that connects control apparatus 20A and controlled device 30A, control apparatus 20A cannot send out control data to network N1 (step S202). In this example, port 26 of control apparatus 20A enters a link down state. Thus, on the basis of the fact that port 26 of control apparatus 20A is in a link down state, device detector 24 of control apparatus 20A may make the determination of step S205 on the assumption that the number of controlled devices that the control data has reached is zero, and thereby determine that the number of controlled devices that the control data has reached is not equal to the actual number of controlled devices.

Hereinafter, detailed descriptions are given of communication paths of control commands and control data when faults have occurred in communication system 1. Specifically, descriptions are given (1) when the system includes a loopback topology and (2) when the system includes a ring topology. The steps illustrated in FIG. 5 are enclosed by parentheses in the following description.

(1) When System Includes Loopback Topology

Figure 6:
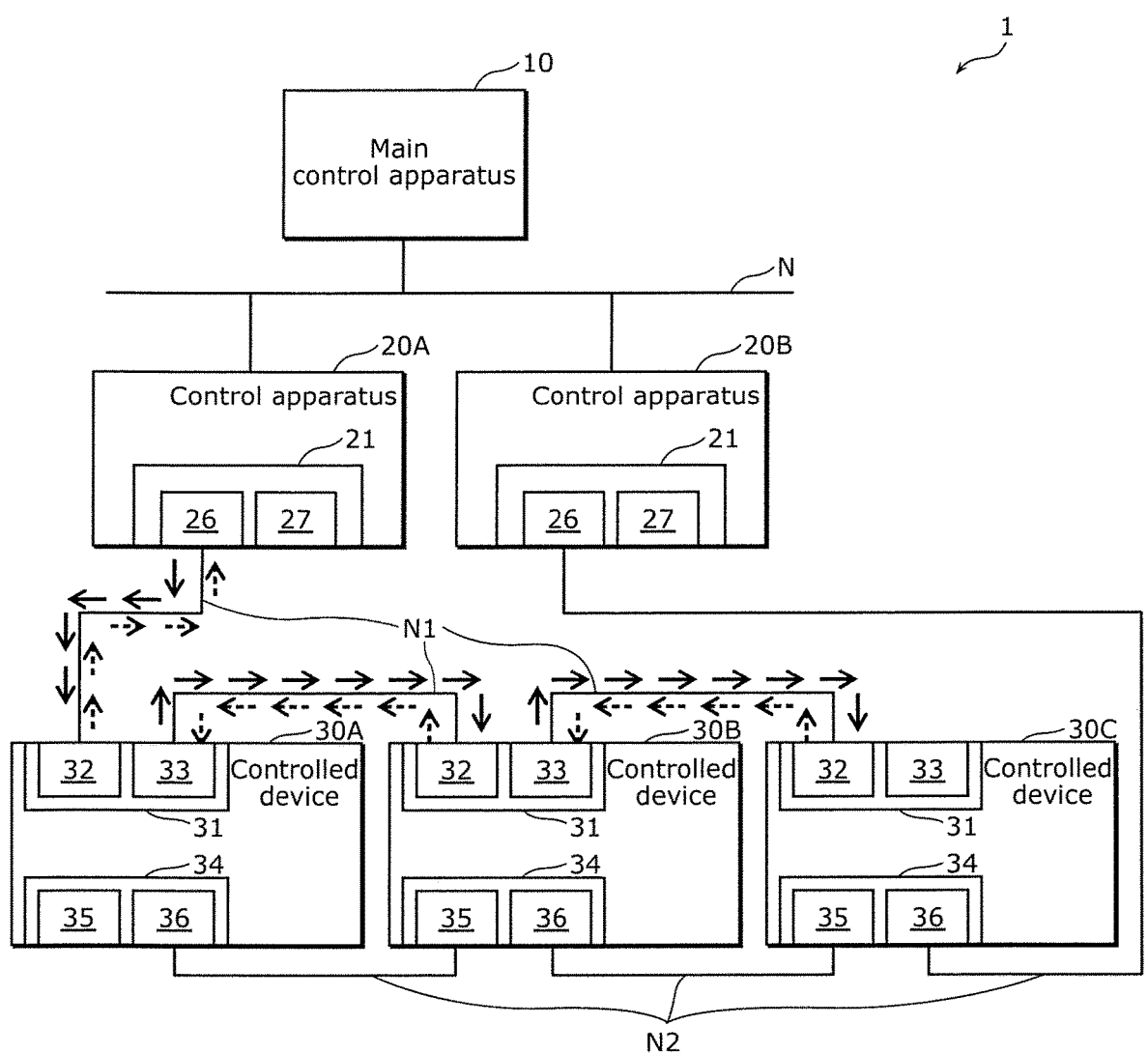
FIG. 6 is an explanatory diagram illustrating a communication path when no faults have occurred in the communication system having a loopback topology according to Example 1.

FIG. 6 is an explanatory diagram illustrating a communication path when no faults have occurred in communication system 1 including a loopback topology according to Example 1. In FIG. 6, network N1 has a loopback topology. In FIG. 6, the flow of control data is indicated by solid lines and broken lines, and the solid lines and the broken lines are used properly for each direction when the control data flows in opposite directions in the same path. The same representation is also used in the following drawings. FIG. 6 will be described with reference to each step in FIG. 5.

In communication system 1 illustrated in FIG. 6, main control apparatus 10 receives a heart-beat signal from control apparatus 20A and transmits a control command to control apparatus 20A (steps S202, S203). Since no faults have occurred in the links to network N1, when control apparatus 20A transmits control data to network N1, the transmitted control data passes through controlled devices 30A, 30B, and 30C via network N1, turns back at controlled device 30C, passes through controlled devices 30B and 30A, and returns to control apparatus 20A. The counter included in the control data received by control apparatus 20A via network N1 indicates three, which is the number of controlled devices 30A, 30B, and 30C and is equal to the total number of controlled devices, i.e., three ("Yes" in step S205). Accordingly, main control apparatus 10 transmits a control command again to control apparatus 20A.

Figure 7:
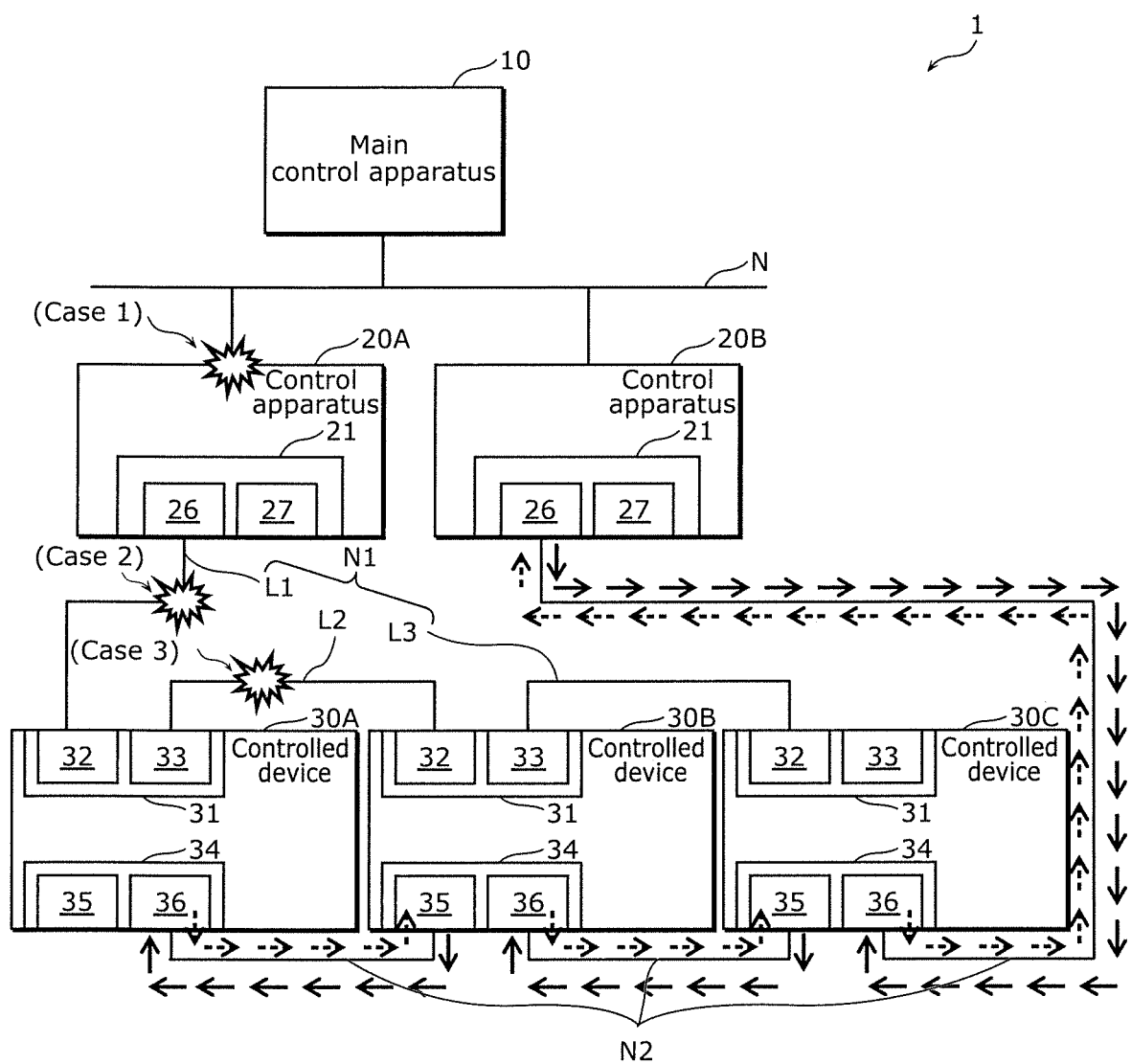
FIG. 7 is an explanatory diagram illustrating a communication path when faults have occurred in the communication system having a loopback topology according to Example 1.

FIG. 7 is an explanatory diagram illustrating a communication path for when faults have occurred in communication system 1 including a loopback topology according to Example 1. Specifically, three situations will be described, namely, when a fault has occurred in control apparatus 20A (1), when a fault has occurred in link L1 that connects control apparatus 20A and controlled device 30A (2), and when a fault has occurred in link L2 that connects controlled devices 30A and 30B (3).

In (1), main control apparatus 10 receives no heart-beat signals from control apparatus 20A, but receives heart-beat signals from control apparatus 20B. Thus, generator 12 of main control apparatus 10 determines that control apparatus 20A is not under normal conditions ("No" in step S201) and control apparatus 20B is under normal conditions ("Yes" in step S221). Accordingly, main control apparatus 10 transmits a control command to control apparatus 20B, and control apparatus 20B sends out and receives control data to and from network N2 (steps S207 to S209).

In (2) and (3), main control apparatus 10 receives heart-beat signals from control apparatus 20A. Thus, generator 12 of main control apparatus 10 determines that control apparatus 20A is under normal conditions ("Yes" in step S201). Accordingly, main control apparatus 10 transmits a control command to control apparatus 20A, and control apparatus 20A sends out control data to network N1 (steps S202, S203). In (2), the number of controlled devices that the control data has reached via network N1 is zero, and in (3), this number is one, which is the number of controlled device 30A. In any event, the number is different from the total number of controlled devices, i.e., three ("No" in step S205). Accordingly, main control apparatus 10 transmits a control command to control apparatus 20B, and control apparatus 20B sends out and receives control data to and from network N2 (steps S207 to S209).

(2) When System Includes Ring Topology

Figure 8:
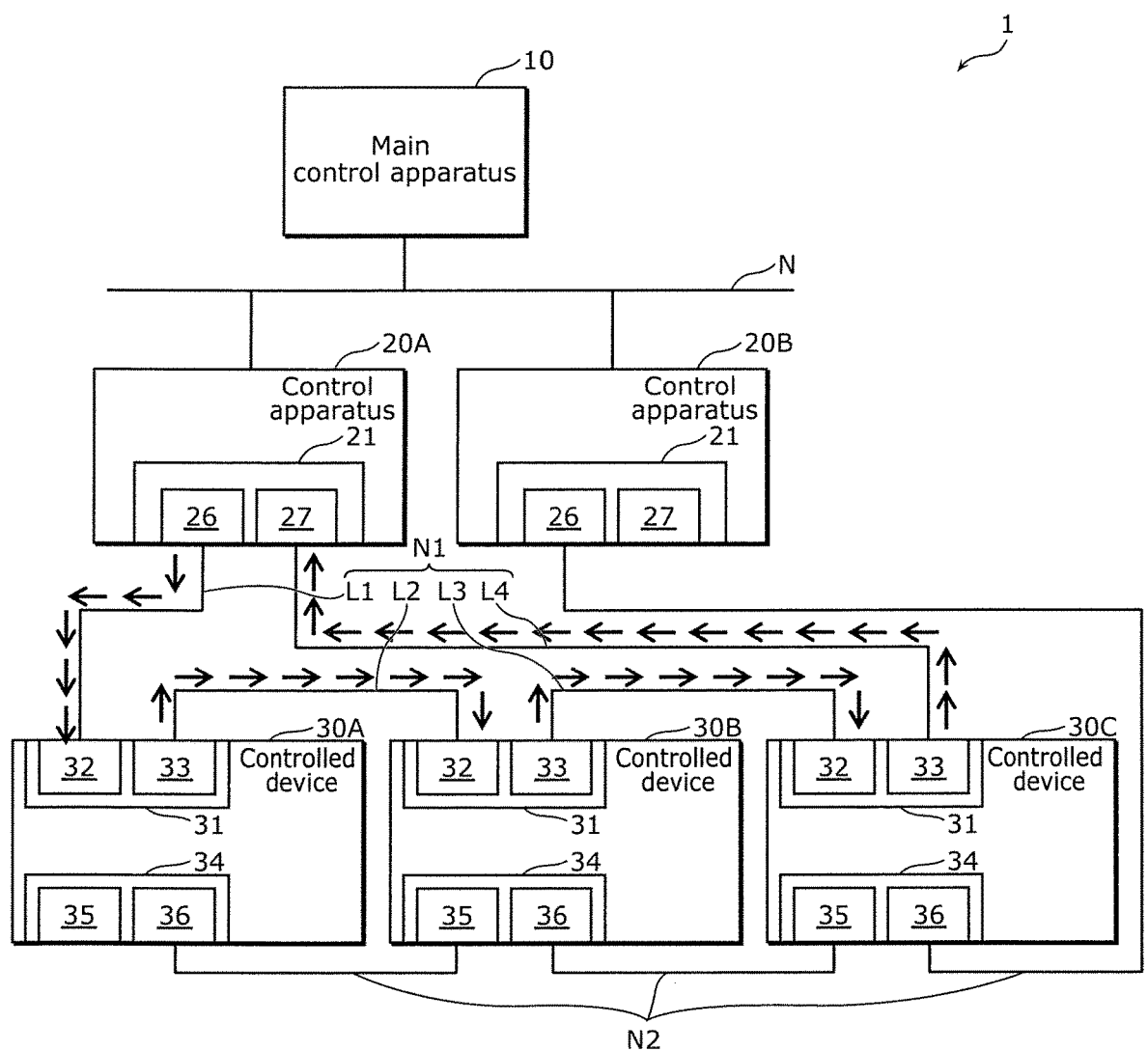
FIG. 8 is an explanatory diagram illustrating a communication path when no faults have occurred in the communication system having a ring topology according to Example 1.

FIG. 8 is an explanatory diagram illustrating a communication path when no faults have occurred in communication system 1 including a ring topology according to Example 1. In FIG. 8, network N1 has a ring topology. Network N1 illustrated in FIG. 8 differs from network N1 illustrated in FIGS. 1 and 6 or other drawings in that link L4 is additionally provided to connect port 33 of controlled device 30C and port 27 of control apparatus 20A.

In communication system 1 illustrated in FIG. 8, main control apparatus 10 receives heart-beat signals from control apparatus 20A and transmits a control command to control apparatus 20A (steps S202, S203). Since no faults have occurred in the links to network N1, when control apparatus 20A transmits control data to network N1, the transmitted control passes through controlled devices 30A, 30B, and 30C and returns to control apparatus 20A via network N1. The counter included in the control data received by control apparatus 20A via network N1 indicates three, which is the number of controlled devices 30A, 30B, and 30C and is equal to the total number of controlled devices, i.e., three ("Yes" in step S205). Accordingly, main control apparatus 10 transmits a control command again to control apparatus 20A.

Figure 9:
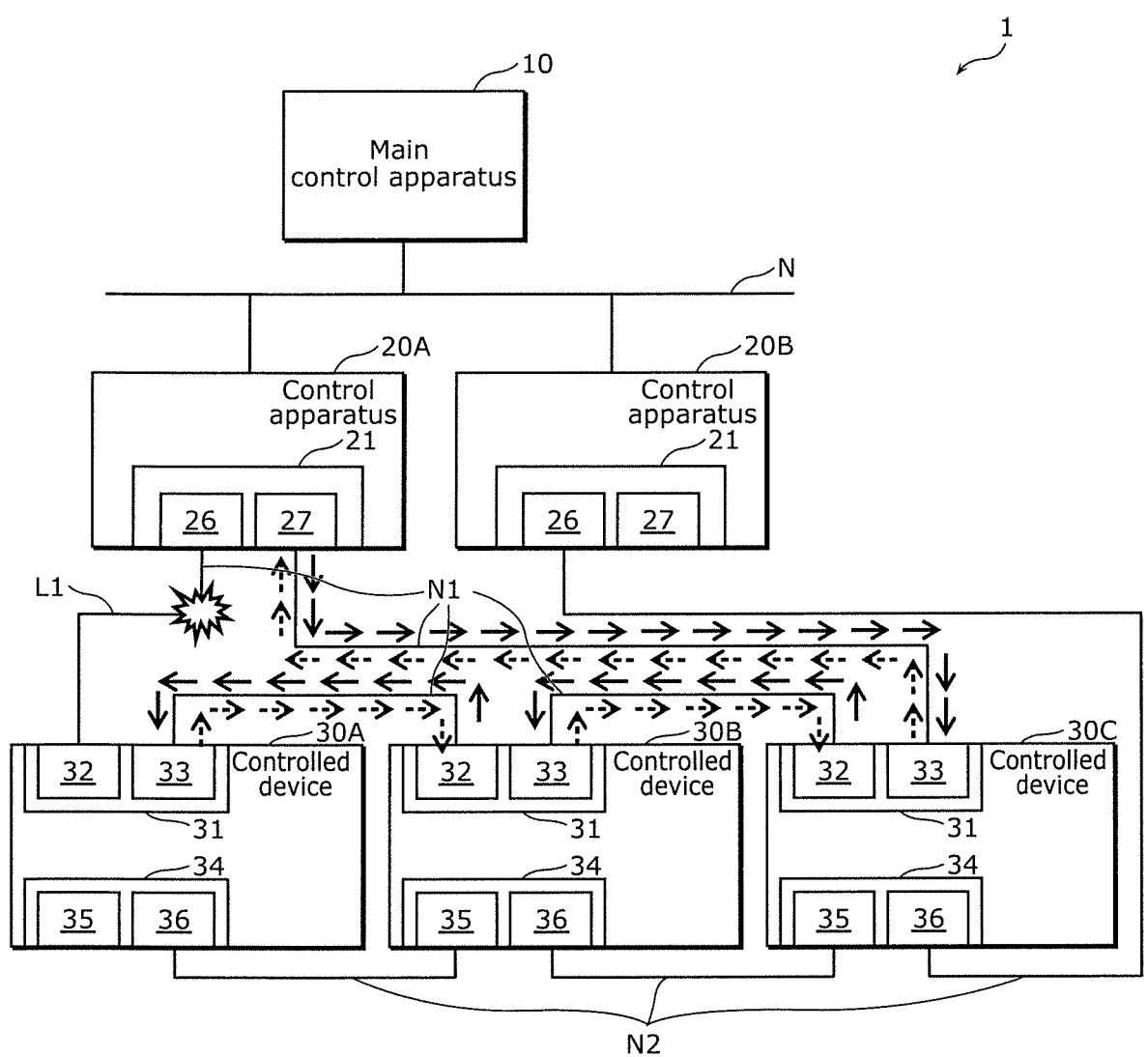
FIG. 9 is a first explanatory diagram illustrating a communication path when a fault has occurred in the communication system having a ring topology according to Example 1.

FIG. 9 is a first explanatory diagram illustrating a communication path when a fault has occurred in communication system 1 including a ring topology according to Example 1. Specifically, a situation is described in which a fault has occurred in link L1 that connects control apparatus 20A and controlled device 30A.

Main control apparatus 10 receives heart-beat signals from control apparatus 20A. Thus, generator 12 of main control apparatus 10 determines that control apparatus 20A is under normal conditions ("Yes" in step S201). Accordingly, main control apparatus 10 transmits a control command to control apparatus 20A, and control apparatus 20A sends out control data to network N1 via communication IF 21 (steps S202, S203). When a fault has occurred in link L1 connected to port 26, control apparatus 20A sends out control data to network N1 via port 27. The counter included in the control data received from network N1 indicates three, which is the number of controlled devices 30A, 30B, and 30C and is equal to the total number of controlled devices, i.e., three ("Yes" in step S205). Accordingly, main control apparatus 10 transmits a control command again to control apparatus 20A.

Figure 10:
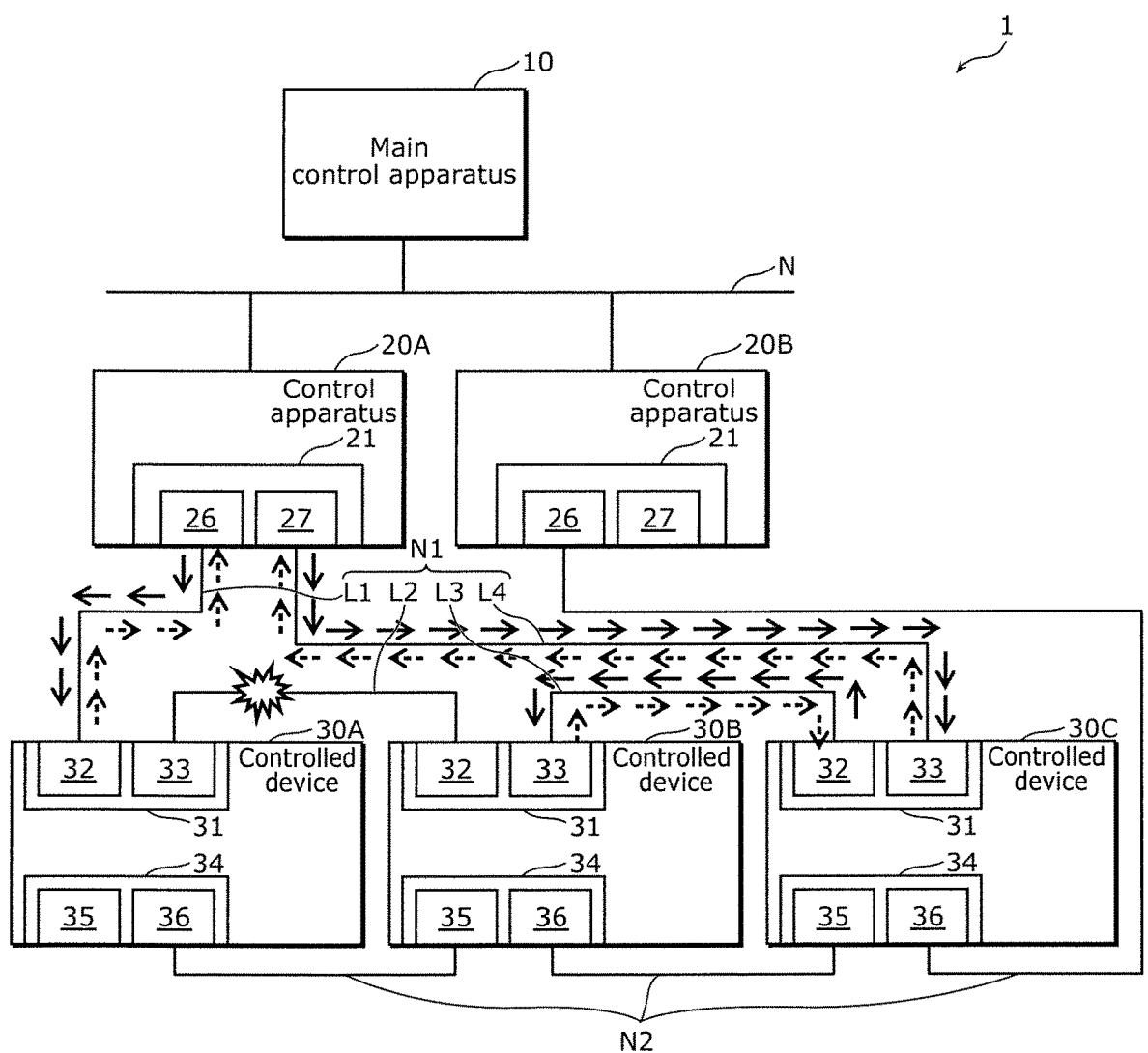
FIG. 10 is a second explanatory diagram illustrating a communication path when a fault has occurred in the communication system having a ring topology according to Example 1.

FIG. 10 is a second explanatory diagram illustrating a communication path when a fault has occurred in communication system 1 including a ring topology according to Example 1. Specifically, a situation is described in which a fault has occurred in link L2 that connects controlled devices 30A and 30B.

Main control apparatus 10 receives heart-beat signals from control apparatus 20A. Thus, generator 12 of main control apparatus 10 determines that control apparatus 20A is under normal conditions ("Yes" in step S201). Accordingly, main control apparatus 10 transmits a control command to control apparatus 20A, and control apparatus 20A sends out control data to network N1 via port 26 (steps S202, S203). When a fault has occurred in link L2, ports 26 and 27 are each regarded as a loopback topology, and links L1, L2, L3, and L4 are regarded as an integral network, under the control of communication IF 21 of control apparatus 20A. As the number of controlled devices that the control data has reached from network N1, device detector 24 detects one via port 26 and detects two via port 27, and determines that the total number of controlled devices that the control data received from network N1 has reached is three, which matches with the total number of controlled devices, i.e., three, for which main control apparatus 10 has transmitted a control command to control apparatus 20A ("Yes" in step S205). Accordingly, main control apparatus 10 transmits a control command again to control apparatus 20A.

Figure 11:
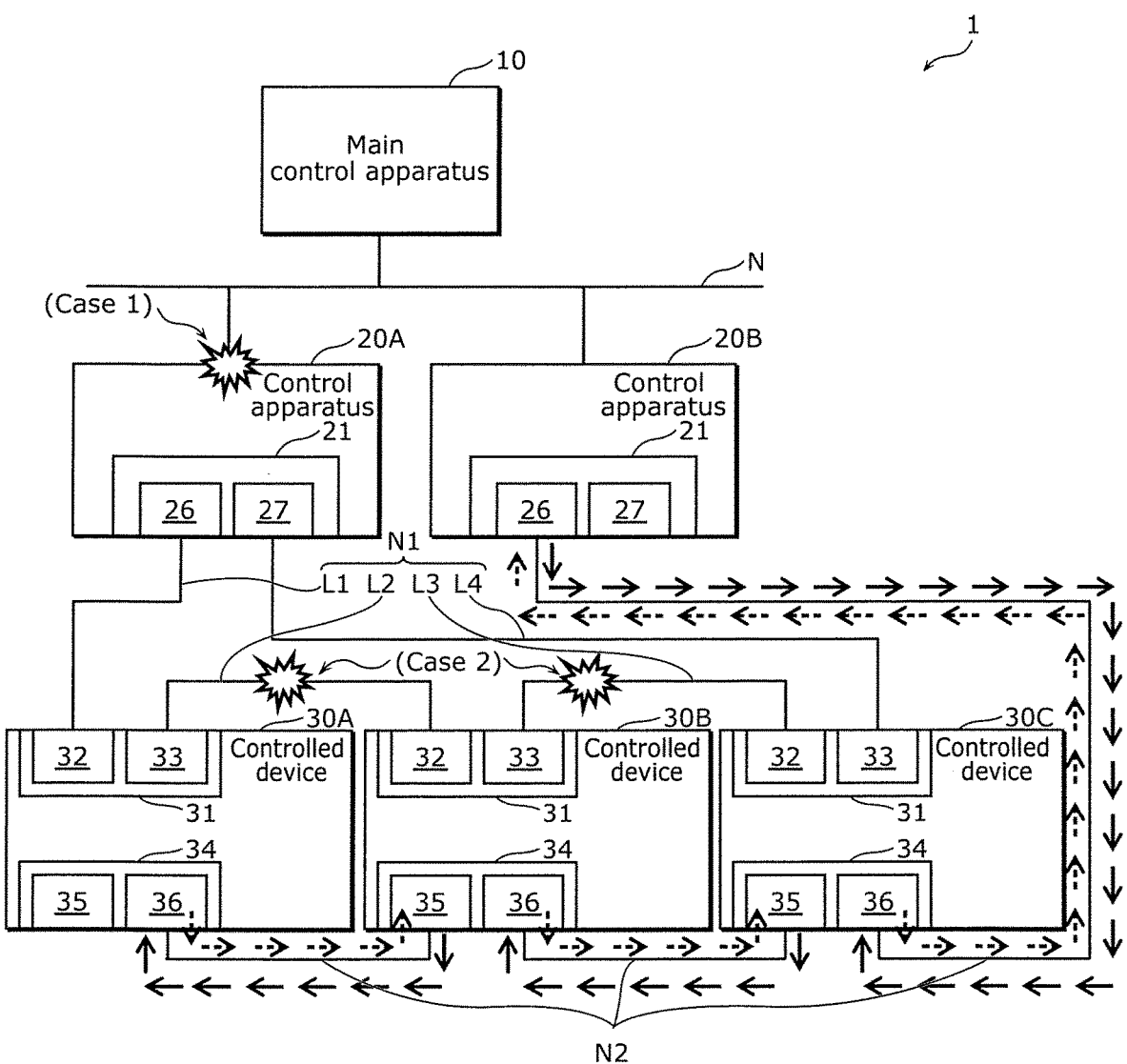
FIG. 11 is a third explanatory diagram illustrating a communication path when faults have occurred in the communication system having a ring topology according to Example 1.

FIG. 11 is an explanatory diagram illustrating a communication path when faults have occurred in communication system 1 including a ring topology according to Example 1. Specifically, two situations will be described, namely when a fault has occurred in control apparatus 20A (1), and when a fault has occurred in link L2 that connects controlled devices 30A and 30B and in link L3 that connects controlled devices 30B and 30C (2).

In (1), main control apparatus 10 does not receive heart-beat signals from control apparatus 20A, and receives heart-beat signals from control apparatus 20B. In this situation, the same processing as that in (1) described above and illustrated in FIG. 7 is performed. As a result, main control apparatus 10 transmits a control command to control apparatus 20B, and control apparatus 20B sends out and receives control data to and from network N2 (steps S207 to S209).

In (2), main control apparatus 10 receives heart-beat signals from control apparatus 20A. Thus, generator 12 of main control apparatus 10 determines that control apparatus 20A is under normal conditions ("Yes" in step S201). Accordingly, main control apparatus 10 transmits a control command to control apparatus 20A, and control apparatus 20A sends out control data to network N1 (steps S202, S203). As illustrated in FIG. 9, links L1, L2, L3, and L4 to network N1 are regarded as an integral network, and the number of controlled devices (controlled devices 30A and 30C) that the control data received from network N1 has reached is two, which is different from the total number of controlled devices, i.e., three (No in step S205).

Accordingly, main control apparatus 10 transmits a control command to control apparatus 20B, and control apparatus 20B sends out and receives control data to and from network N2 (steps S207 to S209).

As described above, when the first network has a loopback topology, communication system 1 described in Example 1 can maintain communications between a control apparatus and a plurality of controlled devices even if a fault has occurred in the active control apparatus or at a single location in the first network. When the first network has a ring topology, communication system 1 can maintain communications between a control apparatus and a plurality of controlled devices even if a fault has occurred in the active control apparatus or at two or more locations in the first network. The term "control apparatus" means at least one of the active control apparatus and the standby control apparatus. In this way, the communication system can configure a ring-type network with enhanced fault tolerance.

The communication system can also easily determine whether the first control has reached all the controlled devices, on the basis of the information that is receded by the controlled devices in the control data circulating through the first network and that indicates the number of controlled devices that the control data has reached. Accordingly, the communication system can more easily configure a ring-type network with enhanced fault tolerance.

The communication system can also easily determine whether the active control apparatus is operating normally, on the basis of whether communication packets have been received from the active control apparatus. Accordingly, the communication system can more easily configure a ring-type network with enhanced fault tolerance.

After the communication system has transitioned from the state in which the active control apparatus is used for communications with the controlled devices to the state in which the standby control apparatus is used for communications with the controlled devices, the communication system can automatically return to the state in which the active control apparatus is used for communications with the controlled devices, on the basis of whether communication packets have been received from the active control apparatus. Accordingly, the communication system can provide easy operability at the time of recovery from faults.

When the first network has a ring topology, the communication system can maintain communications between a control apparatus and a plurality of controlled devices even if a fault has occurred in the active control apparatus or at two or more locations in the first network.

Example 2

This example describes a control method that can be used when a communication system or the like that configures a ring-type network with enhanced fault tolerance includes a greater number of controlled devices than in Example 1.

In communication system 1 according to Example 1, the processing load on control apparatus 20A or 20B increases as the number of controlled devices increases. In view of this, description is given of communication system 2 that reduces the processing load on control apparatus 20A or 20B and can be connected to a greater number of controlled devices.

For example, EtherCAT communication standards allow 65535 controlled devices to be connected to a single network. However, when consideration is given to the processing load on control apparatus 20A, the number of controlled devices that can be connected substantially is smaller than the number allowed by the communication standards and is approximately 255. According to communication system 2 of Example 2, it is possible to increase the number of controlled devices that can be connected substantially to, for example, approximately 512 with a simpler configuration than the configuration of communication system 1 that simply includes two controlled devices.

Figure 12:
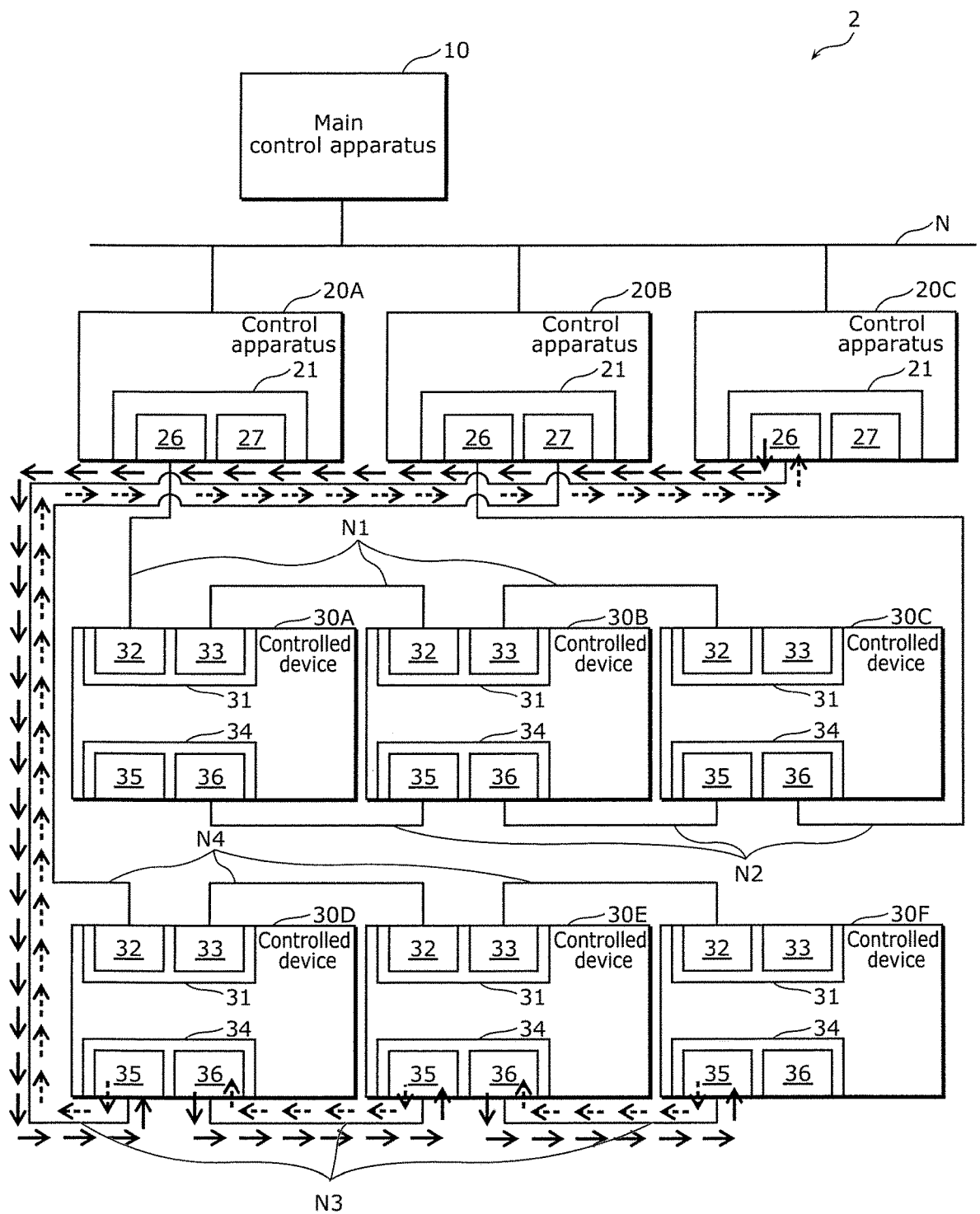
FIG. 12 is an explanatory diagram illustrating a communication path when no faults have occurred in a communication system having a loopback topology according to Example 2.
Figure 13:
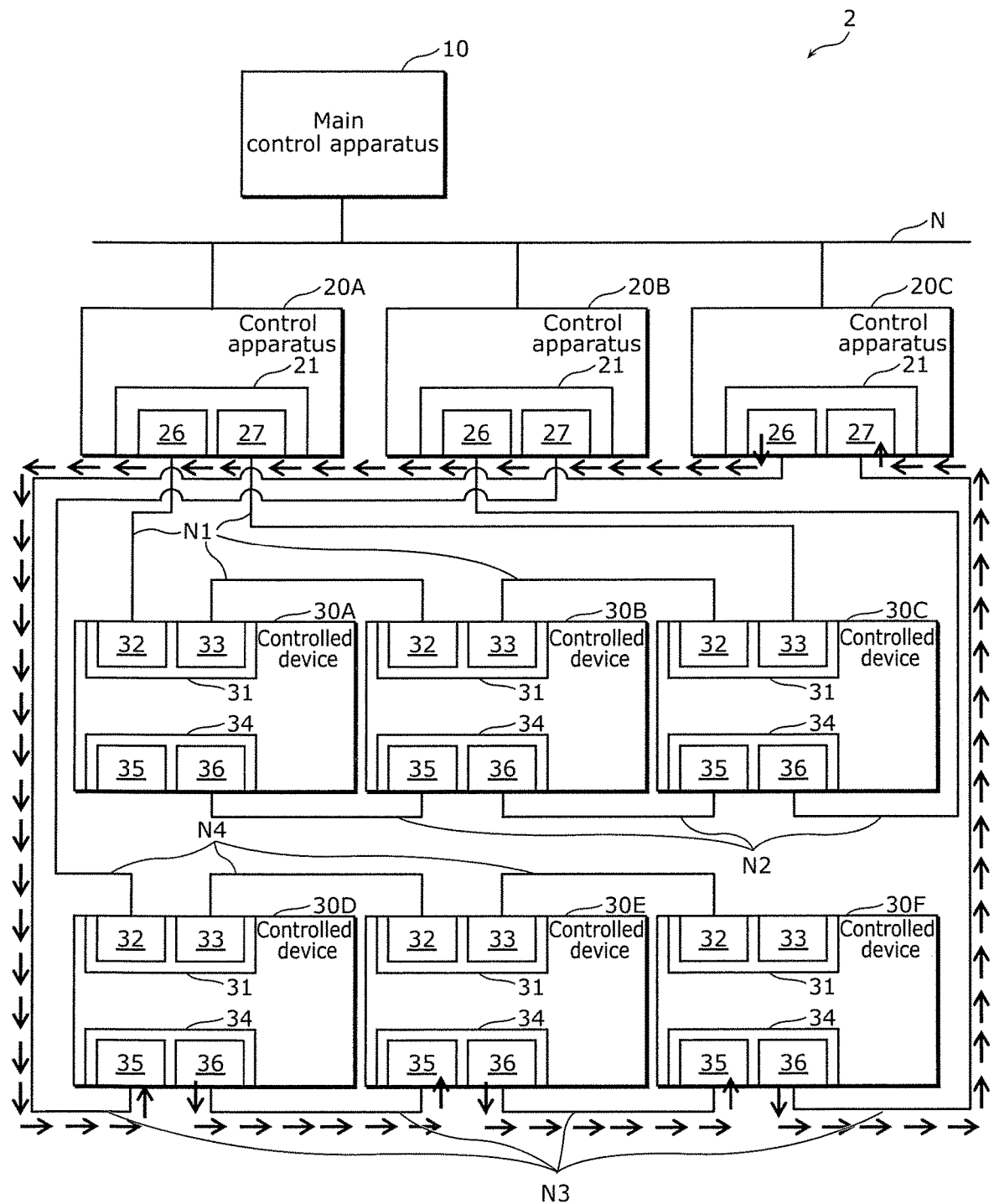
FIG. 13 is an explanatory diagram illustrating a communication path when no faults have occurred in the communication system having a ring topology according to Example 2.

FIG. 12 is an explanatory diagram illustrating a communication path when no faults have occurred in communication system 2 including a loopback topology according to Example 2. FIG. 13 is an explanatory diagram illustrating a communication path when no faults have occurred in communication system 2 including a ring topology according to Example 2.

As illustrated in FIGS. 12 and 13, communication system 2 includes main control apparatus 10, control apparatuses 20A, 20B, and 20C, networks N1, N2, N3, and N4, and controlled devices 30A, 30B, 30C, 30D, 30E, and 30F.

Control apparatus 20A corresponds to a first active device, control apparatus 20C corresponds to a second active device, networks N1, N2, N3, and N4 correspond respectively to first, second, third, and fourth networks, controlled devices 30A, 30B, and 30C correspond to a plurality of first controlled devices, and controlled devices 30D, 30E, and 30F correspond to a plurality of second controlled devices.

Main control apparatus 10, control apparatus 20A, controlled devices 30A, 30B, and 30C, and networks N1 and N2 are the same as those in Example 1 and, therefore, detailed descriptions thereof will not be given.

Control apparatus 20C is a computer that controls controlled device 30D to 30F according to a control command received from main control apparatus 10. Control apparatus 20C is connected to each of controlled device 30D to 30F via network N3. Control apparatus 20C is a control apparatus having a similar function to that of control apparatus 20A. Control apparatus 20C is connected to each of controlled device 30D to 30F via network N3, and sends out control data generated in the same manner as in control apparatus 20A to network N3.

Control apparatus 20B is connected to network N4 via port 27, in addition to having the function of control apparatus 20B according to Example 1. Control apparatus 20B is connected to each of controlled device 30D to 30F via network N4, and sends out control data generated in the same manner as in control apparatus 20A to network N4.

Network N3 is connected to control apparatus 20C and each of controlled device 30D to 30F, and has a similar function to that of network N1. Network N3 can selectively adopt a loopback topology (FIG. 12) using control apparatus 20C as one end and a ring topology (FIG. 13) using control apparatus 20C as part of the ring.

Network N4 is connected to port 27 of control apparatus 20B and each of controlled device 30D to 30F, and has a similar function to that of network N3.

Main control apparatus 10 controls control apparatuses 20A to 20C and controlled devices 30A to 30F. Control performed on control apparatus 20A, port 26 of control apparatus 20B, and controlled devices 30A to 30C is similar to that performed by main control apparatus 10 according to Example 1. Independently of and in the same manner as the above control performed on control apparatus 20A and other components, main control apparatus 10 also performs control over control apparatus 20C, port 27 of control apparatus 20B, and controlled device 30D to 30F. That is, main control apparatus 10 performs control that causes control apparatus 20C to send out control data, and if the sent control data fails to reach at least one of controlled device 30D to 30F, main control apparatus 10 further performs control that causes control apparatus 20B to send out control data via port 27. The control data sent out from control apparatus 20C is also referred to as "third control data," and the control that causes control apparatus 20C to send out control data is also referred to as "third control." Also, the control data sent out from control apparatus 20B via port 27 is also referred to as "fourth control data," and the control that causes control apparatus 20B to send out control data via port 27 is also referred to as "fourth control."

As a result, communication system 2, when including a loopback topology, can maintain control of controlled devices 30D to 30F even if a fault has occurred in control apparatus 20C or at a single location in network N3. That is, the control of controlled devices 30D to 30F can be maintained by sending out control data via port 27 of control apparatus 20B to network N4.

Also, communication system 2, when including a ring topology, can maintain communications between a control apparatus and controlled devices 30D to 30F even if a fault has occurred in control apparatus 20C or at two or more locations in network N3. That is, the control of controlled devices 30D to 30F can be maintained by sending out control data via port 27 of control apparatus 20B to network N4.

In this way, for the communications between a control apparatus and controlled devices 30A to 30C, control apparatus 20A and network N1 function as an active system, and port 26 of control apparatus 20B and network N2 function as a standby system. For the communications between a control apparatus and controlled devices 30D to 30F, control apparatus 20C and network N3 function as an active system, and port 27 of control apparatus 20B and network N4 function as a standby system. Control apparatus 20B is used to serve as a standby system for both of the communications between a control apparatus and controlled devices 30A to 30C and the communications between a control apparatus and controlled devices 30D to 30F. If there is no such double functioning, there is the need to provide two standby control apparatuses. Accordingly, communication system 2 of Example 2 has a simpler configuration than when two communication systems 1 according to Example 1 are simply provided.

Then, concurrently with controlling controlled devices 30A to 30C from main control apparatus 10 via control apparatus 20A, it is possible to control controlled devices 30D to 30F from main control apparatus 10 via control apparatus 20C. As a result, the communication system can communicate with a greater number of controlled devices than communication system 1 according to Example 1.

As described above, the communication system according to Example 2 uses different networks to carry out communications from a control apparatus to a plurality of first controlled devices and communications from a control apparatus to a plurality of second controlled devices. Accordingly, it is possible to communicate with a greater number of controlled devices than above when a single network is used for communications with the controlled devices, and reduce the processing load on the control apparatus. Besides, the standby control apparatus used for the plurality of first controlled devices is also used to control the plurality of second controlled devices. That is, the standby control apparatus is used for both of the communications with the plurality of first controlled devices and the communications with the plurality of second controlled devices. This reduces the number of standby apparatuses and achieves a cost reduction effect.

While our communication systems have been described thus far on the basis of examples thereof, this disclosure is not intended to be limited to those examples. This disclosure also includes other variations obtained by applying various changes by those skilled in the art to each example, and forms obtained by any combination of constituent elements and functions of each example without departing from the scope of the appended claims.

INDUSTRIAL APPLICABILITY

The concepts, apparatuses and methods disclosed is applicable to communication systems that configure ring-type networks with enhanced fault tolerance. More specifically, it is applicable to communication systems or other systems that control industrial equipment.

The invention claimed is:

1. A communication system comprising:
a plurality of controlled devices each including a first interface and a second interface, the first interface having a first input port and a first output port and compliant with Ethernet for Control Automation Technology (EtherCAT) standards, and the second interface having a second input port and a second output port and being compliant with EtherCAT standards;
a first network connected to the first interface of each of the plurality of controlled devices;
a second network connected to the second interface of each of the plurality of controlled devices;
an active control apparatus connected to the first network and capable of sending out first control data that controls the plurality of controlled devices to the first network;
a standby control apparatus connected to the second network and capable of sending out second control data that controls the plurality of controlled devices to the second network; and
a main control apparatus that performs first control that causes the active control apparatus to send out the first control data,
wherein the main control apparatus further performs second control that causes the standby control apparatus to send out the second control data when the first control data that has been sent out fails to reach at least one of the plurality of controlled devices,
in the first control, the active control apparatus acquires a total number of controlled devices that the first control data has reached among the plurality of controlled devices, from information included in the first control data received via the first network, and
the second control is performed upon determining that the total number that has been acquired is smaller than a total number of the plurality of controlled devices.

2. The communication system according to claim 1, wherein the main control apparatus further determines whether a communication packet has been received from the active control apparatus within a predetermined period of time, and performs the second control when it is determined that the communication packet has not been received within the predetermined period of time.

3. The communication system according to claim 2, wherein, after performing the second control in response to the communication packet not being received from the active control apparatus within the predetermined period of time, the main control apparatus further performs the first control when another communication packet has been received from the active control apparatus within another predetermined period of time.

4. The communication system according to claim 1, wherein the first network has a ring topology that connects the active control apparatus and the first interface of each of the plurality of controlled devices.

5. The communication system according to claim 1, further comprising:
a plurality of second controlled devices each including a first interface and a second interface and being different from a plurality of first controlled devices serving as the plurality of controlled devices, the first interface having a first input port and a first output port and being compliant with EtherCAT standards, and the second interface including a second input port and a second output port and being compliant with EtherCAT standards;
a third network connected to the first interface of each of the plurality of second controlled device;
a fourth network connected to the second interface of each of the plurality of second controlled devices; and
a second active control apparatus different from a first active control apparatus serving as the active control apparatus, that is connected to the third network, and that sends out third control data that controls the plurality of second controlled devices to the third network,
wherein the standby control apparatus is further connected to the fourth network,
the standby control apparatus sends out fourth control data that controls the plurality of second controlled devices to the fourth network,
the main control apparatus further performs third control that causes the second active control apparatus to send out the third control data, and
the main control apparatus further performs fourth control that causes the standby control apparatus to send out the fourth control data when the third control data fails to reach at least one of the plurality of second controlled devices.

6. A controlled device comprising:
a first interface having a first input port and a first output port and compliant with Ethernet for Control Automation Technology (EtherCAT) standards; and
a second interface having a second input port and a second output port and compliant with EtherCAT standards,
wherein the first interface is connected to an active control apparatus via a first network, the active control apparatus capable of sending out first control data that controls the controlled device to the first network,
the second interface is connected to a standby control apparatus via a second network, the standby control apparatus capable of sending out second control data that controls the controlled device to the second network,
when the first control data sent out from the active control apparatus has been received, the controlled device operates under control based on the first control data that has been received,
when the second control data sent out from the standby control apparatus has been received, the controlled device operates under control based on the second control data that has been received,
in the first control, the active control apparatus acquires a total number of controlled devices that the first control data has reached among the plurality of controlled devices, from information included in the first control data received via the first network, and
the second control is performed upon determining that the total number that has been acquired is smaller than a total number of the plurality of controlled devices.

7. A method of controlling a communication system comprising:

causing a main control apparatus to perform a first control that causes an active control apparatus to send out a first control data; and causing the main control apparatus to perform a second control that causes a standby control apparatus to send out a second control data when the first control data that has been sent out fails to reach at least one of a plurality of controlled devices, wherein the communication system comprises the plurality of controlled devices each including a first interface and a second interface, the first interface having a first input port and a first output port and compliant with Ethernet for Control Automation Technology (EtherCAT) standards, and the second interface having a second input port and a second output port and compliant with EtherCAT standards; a first network is connected to the first interface of each of the plurality of controlled devices; and a second network is connected to the second interface of each of the plurality of controlled devices, the active control apparatus is connected to the first network and is capable of sending out the first control data that controls the plurality of controlled devices to the first network, the standby control apparatus is connected to the second network and is capable of sending out the second control data that controls the plurality of controlled devices to the second network, in the first control, the active control apparatus acquires a total number of control devices that the first control data has reached among the plurality of controlled devices from information included in the first control data received via the first network, and the second control is performed upon determining that the total number that has been acquired is smaller than the total number of the plurality of control devices in the communication system.

* * * * *